(12) United States Patent
Volker

(10) Patent No.: US 9,568,087 B2
(45) Date of Patent: Feb. 14, 2017

(54) FORCE-COMPENSATED MECHANICAL PRESSURE VESSEL FEEDTHROUGH

(71) Applicant: Herbert B. Volker, Arnold, MD (US)

(72) Inventor: Herbert B. Volker, Arnold, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 434 days.

(21) Appl. No.: 14/156,130

(22) Filed: Jan. 15, 2014

(65) Prior Publication Data

US 2015/0198184 A1 Jul. 16, 2015

(51) Int. Cl.
*F15B 15/02* (2006.01)
*F16H 57/01* (2012.01)

(52) U.S. Cl.
CPC .................................... *F16H 57/01* (2013.01)

(58) Field of Classification Search
CPC ... F16C 29/025; F16C 2300/62; F16C 33/748; F16C 32/0614; F16C 32/06; F16C 32/0696; F15B 15/262; F16F 7/09; F16H 57/01
USPC ............... 137/81.1, 81.2; 92/181 P
See application file for complete search history.

(56) References Cited

U.S. PATENT DOCUMENTS

| 3,374,039 A * | 3/1968 | Voorhies ............. F16C 32/0618 384/114 |
| 3,909,081 A * | 9/1975 | Wilcock ................. F16C 39/04 384/101 |
| 4,885,947 A | 12/1989 | Balter et al. |
| 6,172,372 B1 | 1/2001 | Vanderpot |
| 2004/0255442 A1* | 12/2004 | McDiarmid ...... H01L 21/68742 29/25.01 |

FOREIGN PATENT DOCUMENTS

WO    WO 99/20433    4/1999

* cited by examiner

*Primary Examiner* — John K Fristoe, Jr.
*Assistant Examiner* — Richard Drake
(74) *Attorney, Agent, or Firm* — Tarolli, Sundheim, Covell & Tummino LLP

(57) ABSTRACT

A mechanical feedthrough for a pressure vessel having an outer wall including a cylinder extending through the outer wall. A piston is positioned within and movable relative to the cylinder to transmit at least one of rotational and axial movement through the outer wall of the pressure vessel. A flange of the piston engages a wall of the cylinder to define first and second pressure cavities on opposing sides of the flange. A first fluid passageway fluidly connects the first pressure cavity with a low pressure side of the outer wall such that low pressure forces acting on the piston are counteracted by low pressure forces acting on the flange. A second fluid passageway fluidly connects the second pressure cavity with a high pressure side of the outer wall such that high pressure forces acting on the piston are counteracted by high pressure forces acting on the flange.

17 Claims, 2 Drawing Sheets

FORCE-COMPENSATED MECHANICAL PRESSURE VESSEL FEEDTHROUGH

TECHNICAL FIELD

The present invention relates generally to mechanical feedthroughs, and specifically to a force compensating mechanical feedthrough for a pressure vessel.

BACKGROUND

Mechanical pressure vessel feedthroughs may be used to transmit axial and/or rotational motion into or out of a pressure vessel depending on the desired movement. When it is desirable to provide both motions into a single feedthrough, however, the mechanisms currently used are vastly different from one another. For a purely rotational feedthrough, for instance, a thrust bearing would usually be used to react to the forces imposed by the pressure difference across the feedthrough shaft. Depending upon the particular application environment these forces can be very high, thereby creating the need for large bearings. The complexity can result in high costs and the friction in such large bearings can be detrimental to system performance. On the other hand, for a purely axial feedthrough, for instance, a linear actuator is used that is large enough to overcome the resulting force due to the aforementioned pressure difference. Similar to the bearings used for rotational transmission, these actuators can be very large, thereby resulting in high costs and occupying more space than may be available for the device.

SUMMARY OF THE INVENTION

A mechanical feedthrough for a pressure vessel having an outer wall delimiting a high pressure side and a low pressure side includes a cylinder extending through the outer wall of the pressure vessel and having a wall defining a bore. A piston extends along an axis and is positioned within the bore of the cylinder. The piston extends to the high pressure side and the low pressure side of the pressure vessel and is movable within the bore of the cylinder to transmit at least one of rotational and axial movement through the outer wall of the pressure vessel. The piston includes a radially extending flange that engages the wall of the cylinder to define first and second pressure cavities on opposing sides of the flange. A first fluid passageway fluidly connects the first pressure cavity with the low pressure side such that low pressure forces acting on the piston are counteracted by low pressure forces acting on the flange. A second fluid passageway fluidly connects the second pressure cavity with the high pressure side such that high pressure forces acting on the piston are counteracted by high pressure forces acting on the flange.

Another example of the invention includes a mechanical feedthrough for a pressure vessel having an outer wall delimiting a high pressure side and a low pressure side that includes a cylinder extending through the outer wall of the pressure vessel and having a wall defining a bore. A piston extends along an axis and is positioned within the bore of the cylinder. The piston is movable within the bore to transmit at least one of rotational and axial movement through the outer wall of the pressure vessel. The piston includes a first end surface exposed to the high pressure side and a second end surface exposed to the low pressure side. A radially extending flange has an axial position along the piston and engages the wall of the cylinder to define first and second pressure cavities within the bore on opposing sides of the flange. The flange has a first surface exposed to the first pressure cavity and a second surface exposed to the second pressure cavity. A first fluid passageway extends from the first end surface of the piston past the axial position of the flange to fluidly connect the first pressure cavity with the low pressure side. A second fluid passageway extends from the second end surface of the piston past the axial position of the flange to fluidly connect the second pressure cavity with the high pressure side. The surface area of the first end surface of the piston is equal to the surface area of the second surface of the flange such that high pressure forces acting on the piston equal high pressure forces on the flange. The surface area of the second end surface of the piston is equal to the surface area of the first surface of the flange such that the low pressure forces acting on the piston equal the low pressure forces on the flange.

DETAILED DESCRIPTION

The present invention relates generally to mechanical feedthroughs, and specifically to a force compensating mechanical feedthrough for a pressure vessel. The pressure vessel delimits high and low pressure spaces and contains an object therein to be manipulated from outside the pressure vessel, or contains a mechanism inside the pressure vessel to manipulate an object outside the pressure vessel. In one example, the pressure vessel is a sealed container under vacuum and the exterior of the pressure vessel is at ambient atmospheric pressure. The mechanical feedthrough device includes a cylinder secured to the pressure vessel wall and a piston movable within the cylinder. The piston is connected to a driving device outside the pressure vessel and a driven device inside the pressure vessel for manipulating the object or performing a task in response to operating the driving device. The piston transmits rotational and/or axial motion from outside the pressure vessel to the interior to thereby manipulate the object therein or perform the task. The piston includes a high pressure fluid passageway configured to fully or partially counteract high pressure forces acting on the piston and a low pressure fluid passageway configured to fully or partially counteract low pressure forces acting on the piston. Consequently, the mechanical feedthrough is kept in a substantially force-neutral condition such that the pressure differential across the pressure vessel wall does not cause undesirable axial movement of or forces on the piston before, during or following manipulation of the object or performance of the task.

Figure 1:
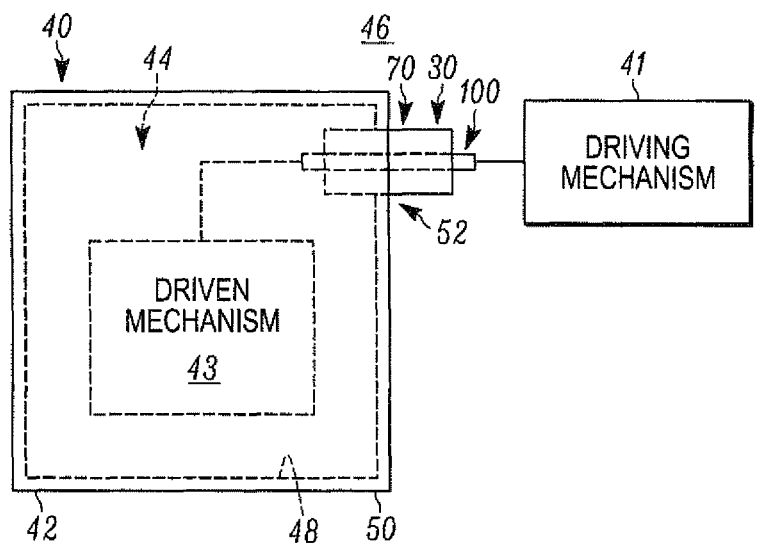
FIG. 1 illustrates an example of a mechanical feedthrough device on a pressure vessel and connecting a driving mechanism and a driven mechanism.
Figure 2:
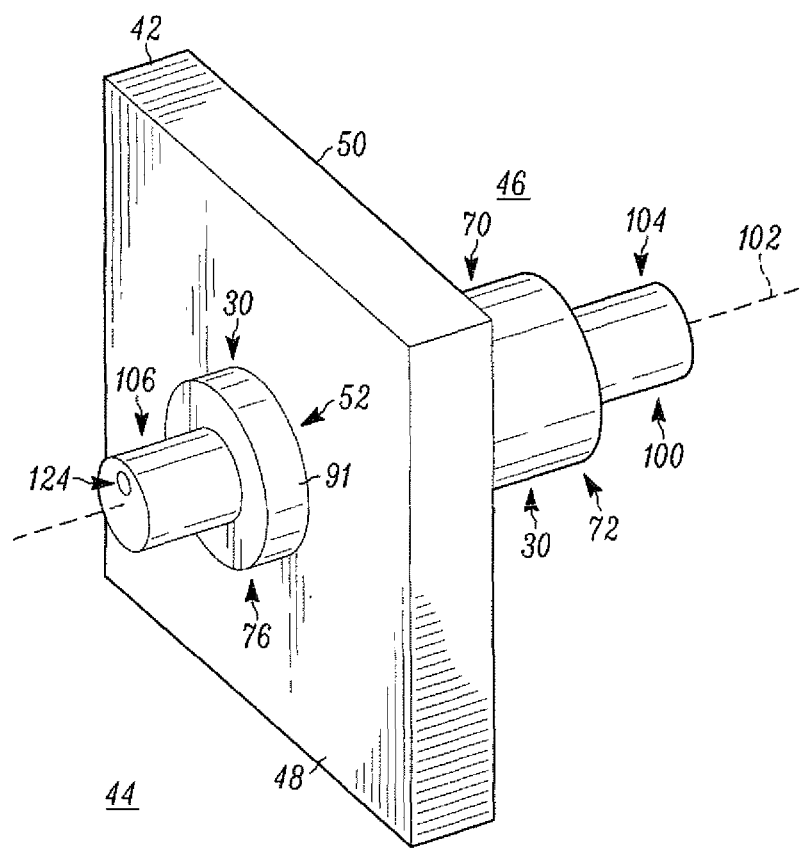
FIG. 2 is an enlarged view of a portion of FIG. 1.

FIGS. 1-5B illustrates an example of a mechanical feedthrough device 30 suitable for use in a pressure vessel 40 in which it is desirable to transfer rotational and/or axial movement from a driving mechanism 41 outside the vessel to a driven mechanism 43 within the vessel. The driven mechanism 43 may constitute an arm or shaft for manipulating an object within the pressure vessel. Referring to FIGS. 1 and 2, the pressure vessel 40 constitutes any known or conventional vessel delimiting high and low pressure sides. Accordingly, the pressure vessel 40 may be submerged underwater, e.g., in deep oceans waters, such that the external, ambient water pressure $P_1$ is very high, e.g., thousands or tens of thousands of psi, while the vessel contains normal atmospheric pressure $P_2$. Alternatively, the pressure vessel 40 may be under vacuum or may be pressurized relative to the ambient, which may be under atmospheric pressure. In any case, dissimilar fluid pressures $P_1$, $P_2$ are present inside and outside the pressure vessel 40.

The vessel 40 includes a wall 42 that defines an inner surface 48 and an outer surface 50. The inner surface 48 defines a sealed interior 44 under normal, atmospheric pressure $P_1$. The outer surface 50 is exposed to the ambient, underwater space 46 outside the pressure vessel 40. The interior 44 of the pressure vessel 40 is therefore at a lower pressure than the ambient space 46. A passageway 52 extends entirely through the wall 42 from the outer surface 50 to the inner surface 48 and is configured to receive the mechanical feedthrough device 30.

Figure 3:
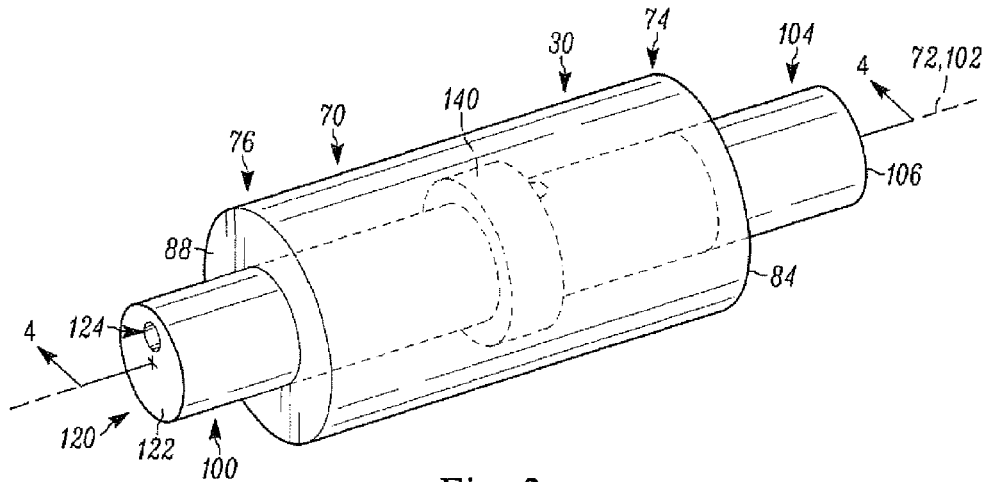
FIG. 3 illustrates the mechanical feedthrough device of FIG. 1.
Figure 4:
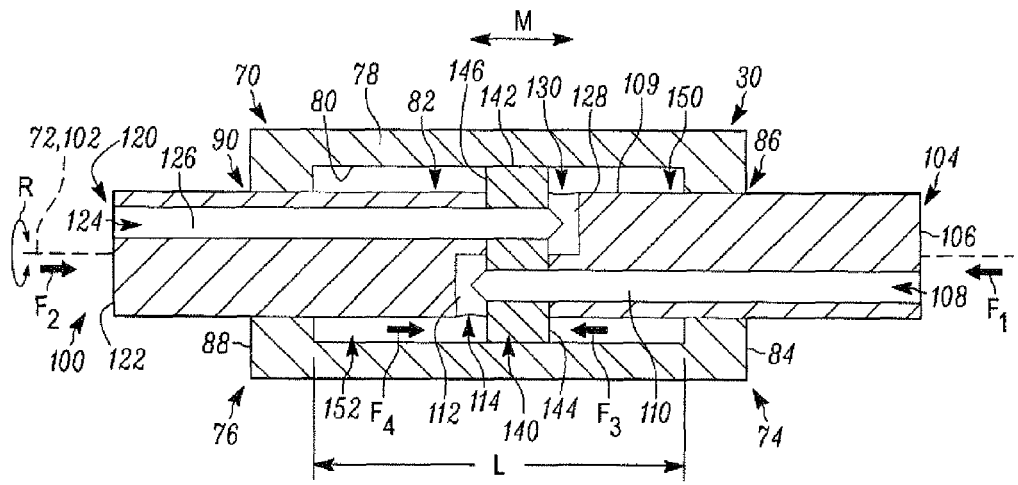
FIG. 4 is a cross-sectional view of the mechanical feedthrough device of FIG. 3 taken along line 4-4.

Referring to FIGS. 3 and 4, the device 30 includes an outer cylinder 70 and a piston 100 disposed in and movable relative to the cylinder. The cylinder 70 has a hollow construction and extends along an axis 72 from a first end 74 to a second end 76. The cylinder 70 includes a wall 78 having an inner surface 80 that defines a bore 82 and an outer surface 91. The inner surface 80 has a cylindrical shape such that the bore 82 extends generally along the axis 72. The first end 74 of the cylinder terminates at an axial end surface 84 and the second end 76 terminates at an axial end surface 88. An opening 86 extends through the end surface 84 to the bore 82 and an opening 90 extends through the end surface 88 to the bore. The openings 86, 90 at each end 74 and 76, respectively, of the cylinder 70 are circular and aligned with one another along the axis 72. The cylinder 70 is made from a durable material, such as metal or plastic, and is nevertheless constructed to withstand the environmental conditions and pressure forces both inside and outside the pressure vessel 40.

Portions 75, 77 of the ends 74, 76 of the cylinder 70 are releasably secured to the wall 78 to provide increased access to the bore 82 and thereby act as end caps for the cylinder. To this end, one or both of the portions 75, 77 is removed from the wall 78 to allow the piston 100 to be readily placed within the bore 82 of the cylinder 70. The portions 75, 77 are then re-secured to the wall 78 in a sealed or fluid-tight manner via threaded and sealed end caps, welding or the like.

Figure 5A:
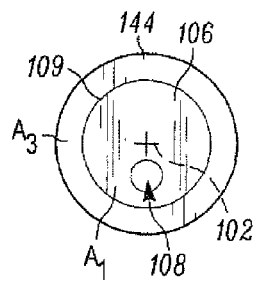
FIG. 5A is a right side view of the mechanical feedthrough device of FIG. 3 with the cylinder removed.
Figure 5B:
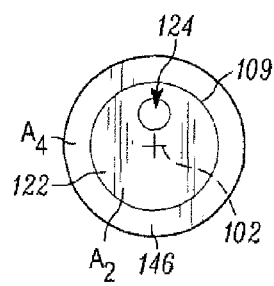
FIG. 5B is a left side view of the mechanical feedthrough device of FIG. 3 with the cylinder removed.

The piston 100 has an elongated, cylindrical shape and extends along an axis 102 from a first end 104 to a second end 120. An outer surface 109 extends from the first end 104 to the second end 106. The first end 104 terminates at a first axial end surface 106 outside of the cylinder 70 and having a surface area indicated generally by $A_1$ (FIG. 5A). The second end 120 terminates at a second axial end surface 122 outside of the cylinder 70 and having a surface area indicated generally by $A_2$ (FIG. 5B). The first and second axial end surfaces 104, 120 extend parallel to one another but may alternatively extend at an angle relative to one another (not shown).

The piston 100 includes an outwardly radially extending flange 140 positioned between the first end 104 and the second end 120. The flange 140 includes a radially outer surface 142 and a pair of axial end surfaces 144, 146. One axial end surface 144 faces the first end 104 of the piston 100 and the other axial end surface 146 faces the second end 106 of the piston. The first axial end surface 144 has a surface area indicated generally by $A_3$ (FIG. 5A) and the second end surface 146 has a surface area indicated generally by $A_4$ (FIG. 5A). In one example, the first axial end surface 144 extends substantially parallel to the second axial end surface 122 of the piston 100 and the second axial end surface 146 extends substantially parallel to the first axial end surface 106 of the piston.

A first fluid passageway 108 extends through the piston 100 and includes a first portion 110 and a second portion 112. The first portion 110 extends substantially parallel to the axis 102 and the second portion 112 extends radially outward from the axis. More specifically, the first portion 110 extends from the first axial end surface 106 and axially beyond the flange 140 towards the second end 120 but terminates prior to the second end. The second portion 112 extends from the first portion 110 radially outward from the axis 102 to an opening 114 in the outer surface 109 of the piston 100.

A second fluid passageway 124 extends through the piston 100 and includes a first portion 126 and a second portion 128. The first portion 126 extends substantially parallel to the axis 102 and the second portion 128 extends radially outward from the axis. More specifically, the first portion 126 extends from the second axial end surface 122 and axially beyond the flange 140 towards the first end 104 but terminates prior to the first end. The second portion 128 extends from the first portion 126 radially outward from the axis 102 to an opening 130 in the outer surface 109 of the piston 100. The first portions 110, 126 of the fluid passageways 108, 124 are therefore substantially parallel to one another. The second portions 112, 128 of the fluid passageways 108, 124 extend at angles relative to one another. The first and second fluid passageways 108, 124 do not intersect one another and are not in fluid communication with one another, i.e., the fluid passageways are fluidly isolated from one another.

The flange 140 is sized and shaped to have substantially the same cross-section as the bore 82 of the cylinder 70. More specifically, the outer surface 142 of the flange 140 is configured to slide axially and circumferentially along the inner surface 80 of the cylinder 70 in a substantially fluid-tight manner. A seal (not shown) may be provided on the outer surface 142 of the flange 140 to provide a fluid-tight engagement between the flange and the cylinder 70 similar to conventional hydraulic or air cylinders.

The cylinder 70 is sized to fit within the passageway 52 in the wall 42 of the pressure vessel 40. Once inserted into the passageway 52, the cylinder 70 is fixed in place to the wall 42 via fasteners, welding, etc. In any case, the cylinder 70 is fixed to the pressure vessel 40 in a fluid-tight manner such that no fluid may pass between the outer surface 91 of the cylinder and the wall 42 of the vessel 40. Consequently, a seal or the like (not shown) may be provided between the wall 42 and the cylinder 70 to ensure the fluid-tight connection.

The piston 100 and the flange 140 are configured such that when the device 30 is secured to and through the wall 42 of the pressure vessel 40 any pressure differential across the wall of the pressure vessel does not cause unwanted axial movement of the piston relative to the cylinder. More specifically, the feedthrough device 30 counterbalances the differential pressure forces applied to the ends 104, 120 of the piston 100 such that the net axial force upon the piston is nearly or equal to zero.

When the flange 140 is positioned within the cylinder 70 the axes 72, 102 are substantially coaxial. The first end 104 of the piston 100 extends through the opening 86 in the first end 74 of the cylinder 70. The second end 120 of the piston 100 extends through the opening 90 in the second end 76 of the cylinder 70. The ends 104, 120 of the piston 100 may be sealed with the openings 86, 90 in the cylinder 70 in a manner typical to hydraulic or air cylinders. Engagement between the flange 140 and the wall 78 of the cylinder 70 separates the bore 82 of the cylinder into a pair of cavities 150, 152, namely, a low pressure cavity 150 and a high pressure cavity 152 on opposite sides of the flange 140. The first or high pressure fluid passageway 108 fluidly connects the high pressure cavity 152 with ambient at the exterior 46 of the pressure vessel 40. The second or low pressure fluid passageway 124 fluidly connects the low pressure cavity 150 with the interior 44 of the pressure vessel 40. It will be understood, however, that the designation of the cavities 150, 152 and fluid passageways 108, 124 may be reversed where the interior 44 of the pressure vessel 40 is at a higher pressure than the exterior 46.

The piston 100 and the flange 140 are movable within and relative to the cylinder 70 and relative to the wall 42 of the pressure vessel 40 to transmit rotational and/or axial motion through the wall from the driving mechanism 41 to the driven mechanism 43, or vice versa. The piston 100 therefore acts as a mechanical feedthrough through the wall 42 of the pressure vessel 40. As shown in FIG. 4, the width W of the flange 140 along the axis 102 is substantially smaller than the length L of the bore 82 through the cylinder 70. Accordingly, the flange 140 and, thus, the piston 100 may be movable within the bore 82 along the axis 72 between the ends 74, 76 of the cylinder 70, as indicated generally by the arrow M. This movement thereby allows for the transmission of axial or longitudinal movement from the driving mechanism 41 to the driven mechanism 43 through the wall 42 of the pressure vessel 40 (see FIG. 1).

Alternatively, the flange 140 may have a width W that is substantially identical to the length L of the bore 82 (not shown) in applications where it is not desirable or necessary to transmit longitudinal movement from the driving mechanism 41 to the driven mechanism 43. In any case, the piston 100 is rotatable about the axes 72, 102 relative to the cylinder 70 in the direction indicated generally by the arrow R, which allows for the transmission of rotational movement, i.e., torque, from the driving mechanism 41 to the driven mechanism 43 through the wall 42 of the pressure vessel 40.

The axial surface 106 at the first end 104 of the piston 100 is exposed to the relatively high fluid pressure $P_1$ at the exterior 46 of the pressure vessel 40. The force $F_1$ exerted by the fluid pressure $P_1$ upon the axial surface 106 is governed by the equation $F_1=P_1 \times A_1$, and pushes the piston 100 in the direction indicated by the arrow $F_1$. Likewise, the axial surface 122 at the second end 120 of the piston 100 is exposed to the relatively lower fluid pressure $P_2$ within the interior 44 of the pressure vessel 40. The force $F_2$ exerted by the fluid pressure $P_2$ upon the axial surface 122 is governed by the equation $F_2=P_2 \times A_2$, and pushes the piston 100 in the direction indicated by the arrow $F_2$. Absent additional forces acting upon the piston 100 any fluid pressure $P_1$, $P_2$ differential between the interior 44 and exterior 46 of the vessel 40 would produce a force imbalance upon the piston 100, thereby causing the piston to slide axially within the cylinder 70 in the leftward direction of FIG. 4 (if $P_1>P_2$) or in the rightward direction of FIG. 4 (if $P_2>P_1$). Since the piston 100 is connected to the driving and driven mechanisms 41, 43 axial movement of the piston not due to prescribed movement of the driving mechanism is undesirable as it results in unwanted movement of the driven mechanism 43.

This undesirable axial movement of the piston 100 due to the pressure differential $P_1$, $P_2$ across the wall 42 of the pressure vessel 40, however, is mitigated or avoided due to the fluid passageways 108, 124 within the piston. In particular, each fluid passageway 108, 124 is used to counterbalance one of the forces $F_1$, $F_2$ such that the net axial force upon the piston 100 is zero, i.e., the piston does not move or shift along the axis 102. To this end, as noted, the first passageway 108 fluidly connects the exterior 46 of the pressure vessel 42 to the high pressure cavity 152 within the cylinder 70. Consequently, the second end surface 146 of the flange 140, which is exposed to the high pressure cavity 152, is in fluid communication with the exterior 46 of the pressure vessel 40 and, thus, the second end surface is exposed to the same fluid pressure $P_1$ as the end surface 106 of the piston 100. The force $F_3$ exerted by the fluid pressure $P_1$ upon the second end surface 146 is therefore governed by the equation $F_3=P_1 \times A_3$, and pushes the piston 100 in the direction F3. Since the same fluid pressure $P_1$ acts upon both end surfaces 106, 146, and the surface areas $A_1$, $A_3$ of the end surfaces are the same it necessarily follows that the force $F_1$ exerted upon the end surface 106 is equivalent to the force $F_3$ exerted upon the second end surface 146. As a result, the forces $F_1$, $F_3$ counterbalance one another such that the net force acting upon the piston 100 due to the high air pressure $P_1$ is zero.

Similarly, as noted, the second passageway 124 fluidly connects the interior 44 of the pressure vessel 40 to the low pressure cavity 150 within the cylinder 70. Consequently, the first end surface 144 of the flange 140, which is exposed to the low pressure cavity 150, is in fluid communication with the interior 44 of the pressure vessel 40 and, thus, the first end surface is exposed to the same fluid pressure $P_2$ as the end surface 122 of the piston 100. The force $F_4$ exerted by the fluid pressure $P_2$ upon the first end surface 144 is therefore governed by the equation $F_4=P_2 \times A_4$, and pushes the piston 100 in the direction $F_4$. Since the same fluid pressure $P_2$ acts upon both end surfaces 122, 144, and the surface areas $A_2$, $A_4$ of the end surfaces are the same it necessarily follows that the force $F_2$ exerted upon the end surface 122 is equivalent to the force $F_4$ exerted upon the first end surface 144. As a result, the forces $F_2$, $F_4$ counterbalance one another such that the net force acting upon the piston 100 due to the low fluid pressure $P_2$ is zero.

Due to this construction of the piston 100, the high pressure forces $F_1$, $F_3$ always counterbalance one another and the low pressure forces $F_2$, $F_4$ always counterbalance one another. The net force upon the piston 100 along the axis 102 due to the pressure differential $P_1$, $P_2$ between the interior 44 and exterior 46 of the pressure vessel 40 is therefore always zero. As a result, the piston 100 does not move axially due to the pressure differential $P_1$, $P_2$ across the wall 42 of the pressure vessel 40 before, during or after operation of the device 30. Accordingly, the piston 100 only moves along the axis 102 during transmission of axial movement from the driving mechanism 41 to the driven mechanism 43 and, thus, this axial movement can be precisely controlled without undue influence from any pressure differential $P_1$, $P_2$ through the wall 42 of the pressure vessel 40.

Although the piston 100 and flange 140 are described as being configured to produce a force-neutral condition for the device 30, e.g., the piston does not move axially in response to the pressure differential $P_1$, $P_2$ across the pressure vessel wall 42, it will be understood that the flange and/or the piston may be altered to meet desired performance criterion or to account for additional factors that impact axial movement of the piston. For example, it may be desirable to account for frictional forces between the ends 104, 120 of the piston 100 and the openings 86, 90 in the cylinder 70 as well as frictional forces between the flange 140 and the wall 78 of the cylinder. To this end, any one or more of the surfaces areas $A_1$-$A_4$ may be varied such that greater or lesser forces $F_1$-$F_4$ compensate for friction in the device 30. Furthermore, any of the surfaces $A_1$-$A_4$ may be configured such that the forces $F_1$-$F_4$ bias the piston 100 forces in one direction or another along the axis 102. Accordingly, the device 30 may partially counteract the high and low fluid pressure $P_1$, $P_2$ forces on the piston 100 or may fully counteract (counterbalance) these forces depending on the particular application.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A mechanical feedthrough for a pressure vessel having an outer wall delimiting a high pressure side and a low pressure side comprising:
    a cylinder extending through the outer wall of the pressure vessel and having a wall defining a bore; and
    a piston extending along an axis and being positioned within the bore of the cylinder, the piston being exposed to the high pressure side and the low pressure side of the pressure vessel and being movable within the bore of the cylinder to transmit at least one of rotational and axial movement through the outer wall of the pressure vessel, the piston including a radially extending flange for engaging the wall of the cylinder to define first and second pressure cavities within the bore on opposing sides of the flange, a first fluid passageway fluidly connecting the first pressure cavity with the low pressure side such that low pressure forces acting on the piston are counteracted by low pressure forces acting on the flange, a second fluid passageway fluidly connecting the second pressure cavity with the high pressure side such that high pressure forces acting on the piston are counteracted by high pressure forces acting on the flange.

2. The mechanical feedthrough of claim 1, wherein the piston includes a first end surface exposed to the high pressure side and a second end surface exposed to the low pressure side, the flange having a first surface exposed to the first pressure cavity and a second surface exposed to the second pressure cavity, the surface area of the first end surface of the piston being equal to the surface area of the second surface of the flange such that the high pressure forces acting on the piston equal the high pressure forces on the flange, the surface area of the second end surface of the piston being equal to the surface area of the first surface of the flange such that the low pressure forces acting on the piston equal the low pressure forces on the flange.

3. The mechanical feedthrough of claim 1, wherein the piston includes a first end surface exposed to the high pressure side and a second end surface exposed to the low pressure side, the flange having a first surface exposed to the first pressure cavity and a second surface exposed to the second pressure cavity, the first and second end surfaces of the piston and the first and second surfaces of the flange being sized such that the high pressure forces and low pressure forces bias the piston towards one of the high pressure side and the low pressure side.

4. The mechanical feedthrough of claim 1, wherein the flange has an axial position along the piston, the first fluid passageway extending from a first end of the piston and past the axial position of the flange, the second fluid passageway extending from a second end of the piston and past the axial position of the flange.

5. The mechanical feedthrough of claim 1, wherein the piston extends from a first end having a first end surface exposed to the high pressure side to a second end having a second end surface exposed to the low pressure side, each end of the piston extending through an opening in the cylinder to the high pressure side and the lower pressure side.

6. The mechanical feedthrough of claim 5, wherein the first and second end surfaces face opposite directions.

7. The mechanical feedthrough of claim 1, wherein each fluid passageway includes a first portion extending axially along the piston and a second portion extending from the first portion radially to an outer surface of the piston.

8. The mechanical feedthrough of claim 7, wherein the first portions of the fluid passageways extend parallel to one another.

9. The mechanical feedthrough of claim 7, wherein the first portions of the fluid passageways extend at an angle relative to one another.

10. The mechanical feedthrough of claim 1, wherein the piston includes a first end for connection to a driving mechanism outside the pressure vessel and a second end for connection to a driven mechanism within the pressure vessel.

11. The mechanical feedthrough of claim 1, wherein the piston includes a first end for connection to a driving mechanism inside the pressure vessel and a second end for connection to a driven mechanism outside the pressure vessel.

12. The mechanical feedthrough of claim 1, wherein the high pressure forces acting on the piston are counterbalanced and the low pressure forces acting on the piston are counterbalanced.

13. A mechanical feedthrough for a pressure vessel having an outer wall delimiting a high pressure side and a low pressure side comprising:
    a cylinder extending through the outer wall of the pressure vessel and having a wall defining a bore; and
    a piston extending along an axis and being positioned within the bore of the cylinder, the piston being movable within the bore to transmit at least one of rotational and axial movement through the outer wall of the pressure vessel, the piston including:
        a first end surface exposed to the high pressure side and a second end surface exposed to the low pressure side;
        a radially extending flange having an axial position along the piston and engaging the wall of the cylinder to define first and second pressure cavities within the bore on opposing sides of the flange, the flange having a first surface exposed to the first pressure cavity and a second surface exposed to the second pressure cavity;

a first fluid passageway extending from the first end surface of the piston past the axial position of the flange to fluidly connect the first pressure cavity with the low pressure side; and a second fluid passageway extending from the second end surface of the piston past the axial position of the flange to fluidly connect the second pressure cavity with the high pressure side;

the surface area of the first end surface of the piston being equal to the surface area of the second surface of the flange such that high pressure forces acting on the piston equal high pressure forces on the flange, the surface area of the second end surface of the piston being equal to the surface area of the first surface of the flange such that the low pressure forces acting on the piston equal the low pressure forces on the flange.

14. The mechanical feedthrough of claim 13, wherein the piston is stationary in response to the low pressure forces and the high pressure forces acting thereon.

15. The mechanical feedthrough of claim 13, wherein changes in at least one of the low pressure forces and the high pressure forces do not cause movement of the piston.

16. The mechanical feedthrough of claim 1, wherein the piston is stationary in response to the low pressure forces and the high pressure forces acting thereon.

17. The mechanical feedthrough of claim 1, wherein changes in at least one of the low pressure forces and the high pressure forces do not cause movement of the piston.

* * * * *